(12) United States Patent
Joo

(10) Patent No.: US 7,086,975 B2
(45) Date of Patent: Aug. 8, 2006

(54) SERPENTINE ACCESSORY-BELT, AGGREGATE, DRIVE ARRANGEMENT OF AN ENGINE

(75) Inventor: Sung-Baek Joo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 154 days.

(21) Appl. No.: 10/658,914

(22) Filed: Sep. 9, 2003

(65) Prior Publication Data

US 2004/0053721 A1 Mar. 18, 2004

(30) Foreign Application Priority Data

Sep. 13, 2002 (KR) ............... 10-2002-0055724

(51) Int. Cl.
*F16H 9/00* (2006.01)
(52) U.S. Cl. ...................................... 474/86
(58) Field of Classification Search .............. 474/86, 474/87, 101, 109, 137, 148, 150, 151; 123/198 R
See application file for complete search history.

(56) References Cited

U.S. PATENT DOCUMENTS

| 5,129,375 A | * | 7/1992 | Takane et al. | ............ 123/90.31 |
| 5,392,751 A | * | 2/1995 | Matsubara et al. | ...... 123/559.1 |
| 5,700,212 A | * | 12/1997 | Meckstroth | ................... 474/70 |
| 6,830,524 B1 | * | 12/2004 | Tamai | ........................ 474/134 |

\* cited by examiner

*Primary Examiner*—Vicky A. Johnson
(74) *Attorney, Agent, or Firm*—Morgan Lewis & Bockius LLP

(57) ABSTRACT

A serpentine accessory-belt, aggregate, drive arrangement wherein an intake side of an engine block is placed toward the frontal side of a vehicle, and engine accessories are mounted at the right side of the engine in a forward direction of the vehicle, enabling to minimize thermal damage to a serpentine belt and facilitate accessibility and maintenance of the engine.

8 Claims, 3 Drawing Sheets

FRONT SIDE OF A VEHICLE
(FORWARD DIRECTION OF THE VEHICLE)

SERPENTINE ACCESSORY-BELT, AGGREGATE, DRIVE ARRANGEMENT OF AN ENGINE

CROSS-REFERENCE TO RELATED APPLICATIONS

This application claims priority of Korean Application No. 10-2002-0055724, filed on Sep. 13, 2002, the disclosure of which is incorporated fully herein by reference.

FIELD OF THE INVENTION

The present invention relates to a serpentine accessory-belt, aggregate, drive arrangement of an engine that turns multiple accessories on the front of an engine such as a water pump, a power steering pump, an alternator, and an air-conditioner pump, all driven by a driving force generated by the engine. More particularly, the present invention relates to the arrangement of engine accessories for being driven via a serpentine belt.

SUMMARY OF THE INVENTION

Embodiments of the present invention provide particular arrangements for accessories of an engine that are advantageous in preventing thermal damage to a serpentine belt and facilitating the maintenance of engine accessories. The intake side of the engine is preferably disposed to face the front of a vehicle while the passive system of the engine is positioned at the right side in relation to the forward direction of the vehicle.

In accordance with one embodiment of the present invention, there is provided a serpentine accessory-belt, aggregate, drive arrangement of an internal combustion engine. The arrangement is preferably provided on a frontal side of the engine block. A drive pulley is connected to a crankshaft for rotating therewith and is located at a lower central position of the engine. A first accessory aggregate pulley, when seen in a vertical direction, is located above the drive pulley and, when seen in a horizontal direction, is spaced in a first direction from the drive pulley. An accessory aggregate pulley set, including a second accessory aggregate pulley, when seen in a horizontal direction, is spaced in a second direction opposite to the first direction from the drive pulley. An idler/tensioning pulley set, which includes an adjustable tensioning pulley and two idler pulleys, and when seen in a horizontal direction, is spaced in the second direction from the drive pulley and is located between the drive pulley and the accessory aggregate pulley set. A serpentine belt extends from the drive pulley to the tensioning pulley and from the tensioning pulley to the first accessory aggregate pulley.

According to another embodiment of the present invention, a serpentine accessory-belt, aggregate, drive arrangement for an internal combustion engine is also provided on a frontal side of an engine block. In this embodiment, a drive pulley is connected to a crankshaft for rotating therewith and located at a lower central position of the engine. A first accessory, aggregate pulley, when seen in a vertical direction, is located above the drive pulley and, when seen in a horizontal direction, is spaced in a first direction from the drive pulley. A pulley unit, including an accessory aggregate pulley set with a second accessory aggregate pulley and an adjustable tensioning pulley and two idler pulleys, is located within a corridor space which is substantially equidistant and extends substantially vertically and which, when seen in a horizontal direction, is spaced in a second direction opposite to the first direction from the drive pulley. The tensioning pulley and the idler pulleys, when seen in a horizontal direction, are located between the accessory aggregate pulley set and the drive pulley. The serpentine belt extends from the drive pulley to the tensioning pulley and from the tensioning pulley to the first accessory aggregate pulley.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

Hereinafter, the preferred embodiment of the present invention will be described in detail with reference to the accompanying drawings.

Figure 1:
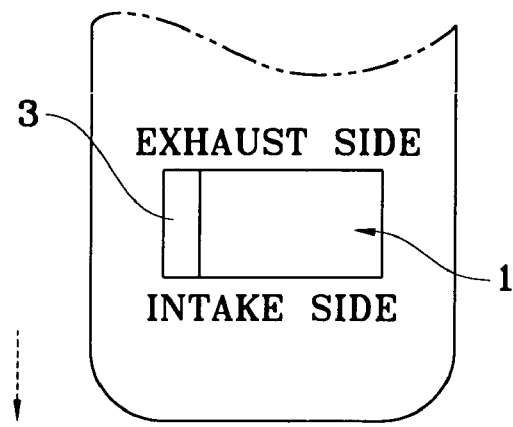
FIG. 1 schematically illustrates a mounted state of an engine inside an engine room according to an embodiment of the present invention.
Figure 2:
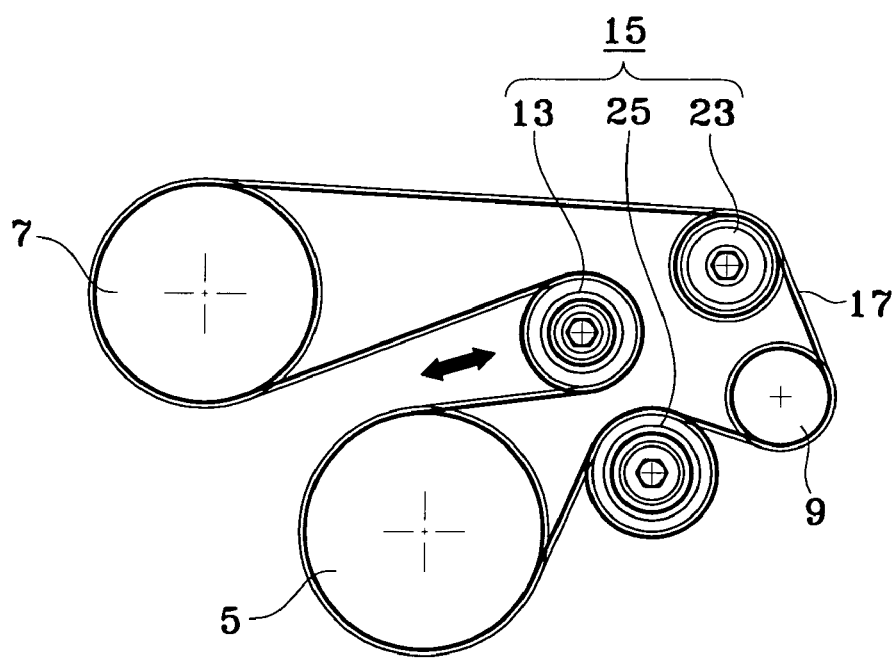
FIGS. 2 to 4 illustrate exemplary embodiments of show serpentine belt accessory, aggregate drive arrangements according to embodiments of the present invention.
Figure 3:
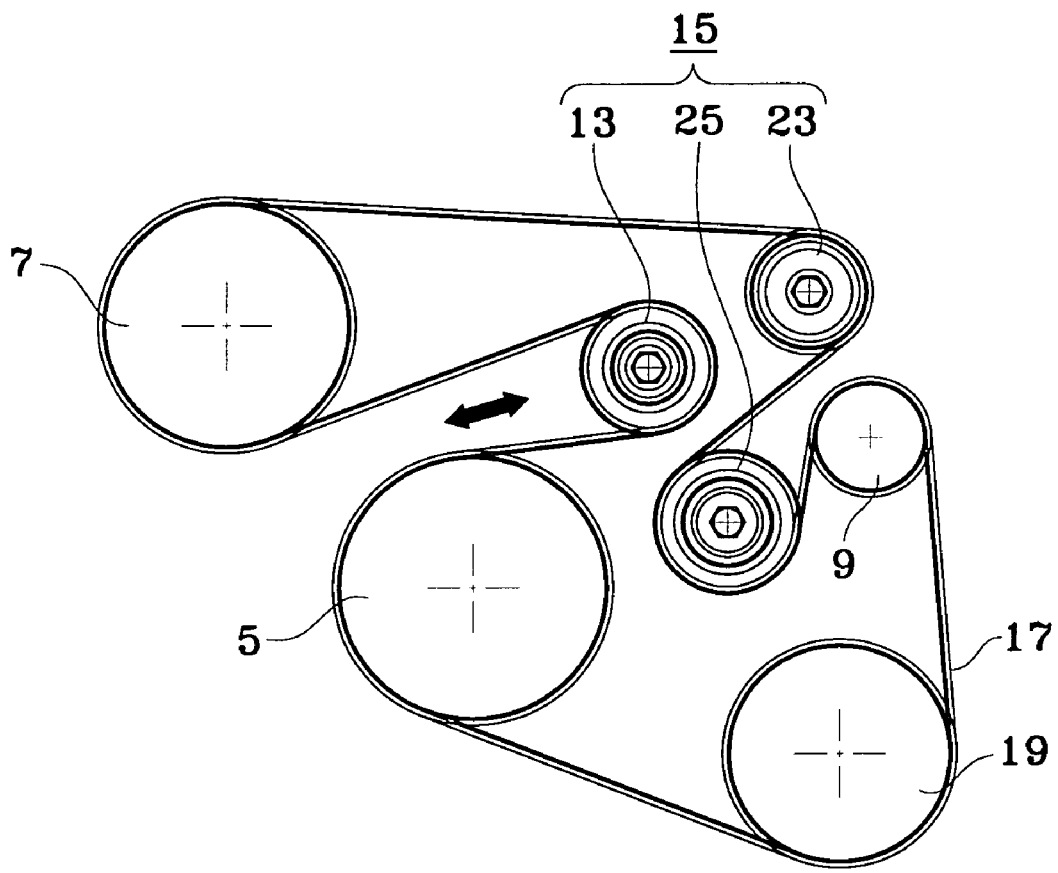
Figure 4:
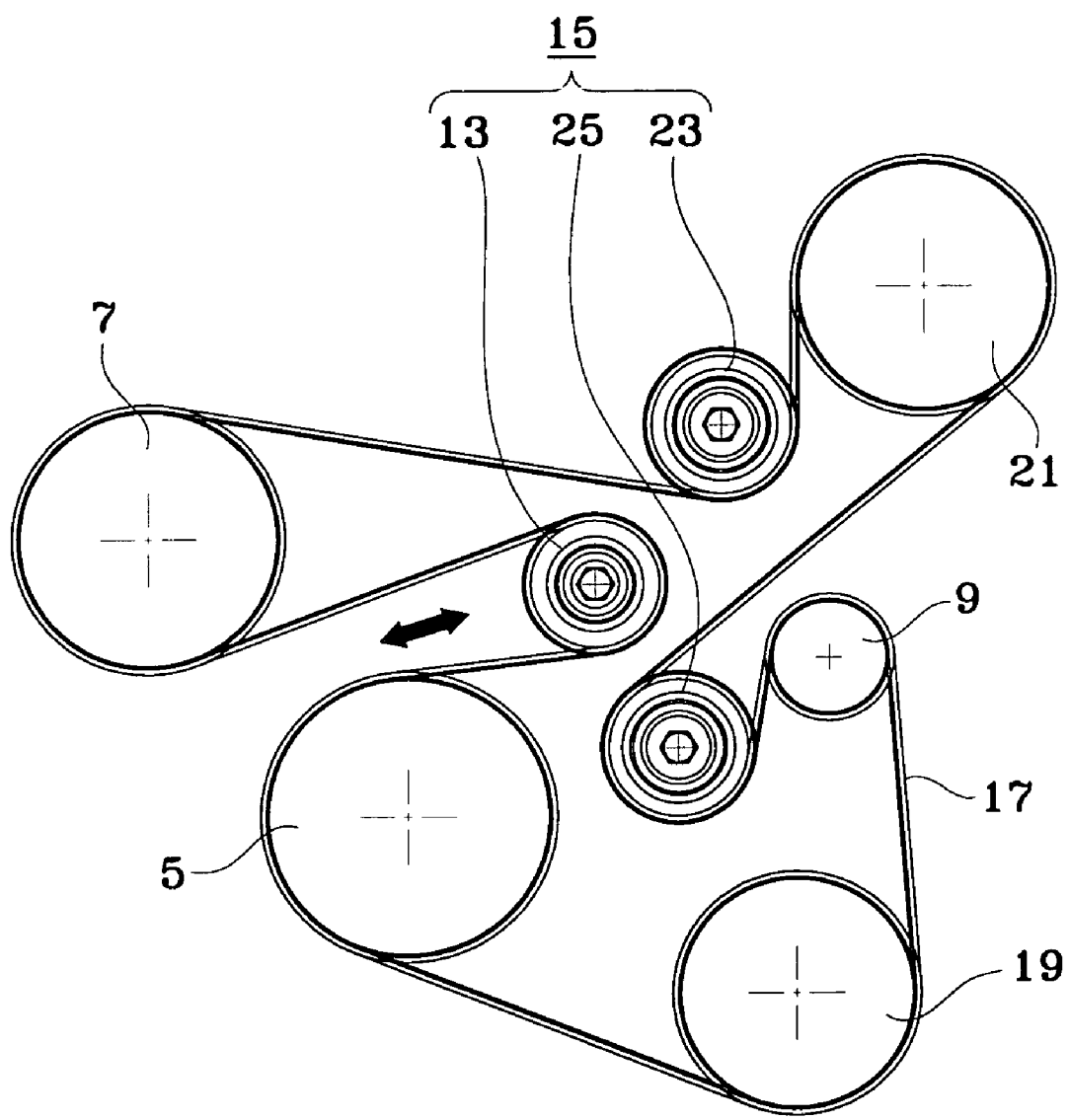

FIG. 1 illustrates an engine room wherein an engine 1 is installed, and the intake side of the engine 1 is placed toward the front of a vehicle and engine accessories 3 are mounted at the right side of the engine 1 in the forward direction of the vehicle. FIGS. 2 to 4 illustrate an engine where the intake side of the engine is placed toward the front of a vehicle and engine accessories are arranged at the right side of the engine in the forward direction of the vehicle.

With reference to FIG. 2, a serpentine accessory-belt, aggregate, drive arrangement of an internal combustion engine is provided on a frontal side of the engine block. The arrangement comprises a drive pulley (5) connected to a crankshaft for rotation therewith. Located at a lower central position of the engine is a first accessory aggregate pulley (7), which, when seen in a vertical direction, is located above the drive pulley (5) and, when seen in a horizontal direction, is spaced in a first direction from the drive pulley (5). An accessory aggregate pulley set is provided including a second accessory aggregate pulley (9), which, when seen in a horizontal direction, is spaced in a second direction opposite to the first direction from the drive pulley (5). An idler/tensioning pulley set (15), which includes an adjustable tensioning pulley (13) and two idler pulleys, when seen in a horizontal direction, is spaced in the second direction from the drive pulley (5) and is located between the drive pulley (5) and the accessory aggregate pulley set. The serpentine belt (17) extends from the drive pulley (5) to the tensioning pulley (13) and from the tensioning pulley (13) to the first accessory aggregate pulley (7).

As shown in FIG. 3, the accessory aggregate pulley set has a third accessory aggregate pulley (19), which, when seen in a horizontal direction, is located at a level of the second accessory aggregate pulley (9) and, when seen in a vertical direction, is located below the second accessory aggregate pulley (9).

In FIG. 4, the accessory aggregate pulley set has a fourth accessory aggregate pulley (21) which, when seen in a horizontal direction, is located at a level of the second accessory aggregate pulley (9) and, when seen in a vertical direction, is located above the second accessory aggregate pulley (9).

As shown in FIGS. 2 to 4, the idler pulleys commonly have an upper pulley (23) and a lower pulley (25), with the tensioning pulley (13) which, when seen in a vertical direction, is located between the two idler pulleys.

In FIG. 2, the serpentine belt (17) sequentially extends from the first accessory aggregate pulley (7) to the upper pulley (23), from the upper pulley (23) to the second accessory aggregate pulley (9), from the second accessory aggregate pulley (9) to the lower pulley (25), and from the lower pulley (25) to the drive pulley (5).

In FIG. 3, the serpentine belt (17) sequentially extends from the first accessory aggregate pulley (7) to the upper pulley (23), from the upper pulley (23) to the lower pulley (25), from the lower pulley (25) to the second accessory aggregate pulley (9), from the second accessory aggregate pulley (9) to the third accessory aggregate pulley (19), and from the third accessory aggregate pulley (19) to the drive pulley (5).

In FIG. 4, the serpentine belt (17) continuously extends from the first accessory aggregate pulley (7) to the upper pulley (23), from the upper pulley (23) to the fourth accessory aggregate pulley (21), from the fourth accessory aggregate pulley (21) to the lower pulley (25), from the lower pulley (25) to the second accessory aggregate pulley (9), from the second accessory aggregate pulley (9) to the third accessory aggregate pulley (19), and from the third accessory aggregate pulley (19) to the drive pulley (5).

In FIGS. 2 and 3, the drive pulley (5), the accessory aggregate pulleys, and the upper pulley (23) are located at the inner side of the serpentine belt (17), while the tensioning pulley (13) and the lower pulley (25) are arranged at the outer side of the serpentine belt (17).

In FIG. 4, the drive pulley (5), and the accessory aggregate pulleys are located at the inner side of the serpentine belt (17), while the tensioning pulley (13) and the idler pulleys are arranged at the outer side of the serpentine belt (17).

The first direction is the exhaust side of the engine block and the second direction is the intake side of the engine block. This division indicates that the serpentine belt (17) is primarily placed at the intake side, which has a relatively lower temperature than the exhaust side of the engine block. This position prevents the serpentine belt (17) from thermal damage, especially in the embodiments of FIGS. 3 and 4.

In the case of FIG. 2, this arrangement may not be effective in preventing thermal damage of the serpentine belt (17), but as the basic structure for FIGS. 3 and 4, additional engine accessories can be applied and mounted on the engine block of the fundamental structure of FIG. 2.

In other words, a vehicle having neither an air-conditioner nor a power steering apparatus, uses the arrangement according to FIG. 2. Thus, FIG. 2 provides the fundamental disposition in the case where either an air-conditioner or a power steering apparatus is installed (shown in FIG. 3) or both the air-conditioner and power steering apparatuses are installed (shown in FIG. 4) for good application.

Also, engine accessories disposed toward the intake side thus described allows an operator to easily access the engine placed inside an engine room as illustrated in FIG. 1, facilitating the maintenance of the engine.

The components of the engine accessories include a water pump, a power steering pump, an alternator, and an air-conditioner.

FIGS. 2 to 4 can be described in another embodiment as follows.

FIG. 4 illustrates an arrangement which includes a drive pulley (5) connected to the crankshaft for rotation therewith. Located at a lower central position of the engine, a first accessory aggregate pulley (7), which, when seen in a vertical direction, is located above the drive pulley (5) and, when seen in a horizontal direction, is spaced in a first direction from the drive pulley (5). A pulley unit includes an accessory aggregate pulley set with a second accessory aggregate pulley (9) and an adjustable tensioning pulley (13) and two idler pulleys. The pulley unit is located within a corridor space which is substantially equidistant and which extends substantially vertically and which, when seen in a horizontal direction, is spaced in a second direction opposite to the first direction from the drive pulley (5). The tensioning pulley (13) and the idler pulleys, when seen in a horizontal direction, are located between the accessory aggregate pulley set and the drive pulley (5). The serpentine belt (17) extends from the drive pulley (5) to the tensioning pulley (13) and from the tensioning pulley (13) to the first accessory aggregate pulley (7).

As illustrated in FIG. 3, compared to FIG. 2, the accessory aggregate pulley set has a third accessory aggregate pulley (19) which, when seen in a horizontal direction, is located at a level of the second accessory aggregate pulley (9) and, when seen in a vertical direction, is located below the second accessory aggregate pulley (9).

As illustrated in FIG. 4, compared to FIG. 3, the accessory aggregate pulley set has a fourth accessory aggregate pulley (21) which, when seen in a horizontal direction, is located at a level of the second accessory aggregate pulley (9) and, when seen in a vertical direction, is located above the second accessory aggregate pulley (9).

Of course, the arrangements of the idler pulleys, the tensioning pulley (13), and the serpentine belt (17) wound therearound can be arranged as described in the first embodiment.

As apparent from the foregoing, there is an advantage in a serpentine accessory-belt, aggregate, drive arrangement in that an intake side of an engine block is placed toward the frontal side of a vehicle, wherein engine accessories are disposed at the right side of the engine in a forward direction of the vehicle, enabling to minimize thermal damage to a serpentine belt and facilitating easy accessibility and maintenance of the engine.

What is claimed is:

1. A serpentine accessory-belt, aggregate, drive arrangement for an internal combustion engine, comprising:
a drive pulley connected to a crankshaft for rotation therewith and located at a lower central portion of the engine;
a first accessory aggregate pulley which, when seen in a vertical direction, is located above said drive pulley and, when seen in a horizontal direction, is spaced in a first direction from said drive pulley;
an accessory aggregate pulley set including
a second accessory aggregate pulley which, when seen in a horizontal direction, is spaced in a second direction opposite to said first direction from said drive pulley,
and
a third accessory aggregate pulley which, when seen in a horizontal direction, is located at a level of said second accessory aggregate pulley and, when seen in a vertical direction, is located below said second accessory aggregate pulley; and
an idler/tensioning pulley set which includes an adjustable tensioning pulley and two idler pulleys, said idler pulleys having an upper pulley and a lower pulley, with said tensioning pulley,
when seen in a vertical direction, located between said two idler pulleys,
and wherein the idler/tensioning pulley set, when seen in a horizontal direction, is spaced in said second direction from said drive pulley and is located between said drive pulley and said accessory aggregate pulley set, with a serpentine belt extending from said drive pulley to said tensioning pulley, from said tensioning pulley to said first accessory aggregate pulley, from said first accessory aggregate pulley to said upper pulley, from said upper pulley to said lower pulley, from said lower pulley to said second accessory aggregate pulley, from said second accessory aggregate to said third accessory aggregate pulley, and from said third accessory aggregate pulley to said drive pulley.

2. The serpentine accessory-belt, aggregate, drive arrangement according to claim 1, wherein said pulleys are mounted on a front side of the engine.

3. The serpentine accessory-belt, aggregate, drive arrangement according to claim 1, wherein said drive pulley, said accessory aggregate pulleys, and said upper pulley are located at the inner side of said serpentine belt, while said tensioning pulley and said lower pulley are arranged at the outer side of said serpentine belt.

4. The serpentine accessory-belt, aggregate, drive arrangement according to claim 1, the arrangement being provided on a frontal side of said engine block wherein said first direction is an exhaust side of said engine block and said second direction is an intake side of said engine block.

5. A serpentine accessory-belt, aggregate, drive arrangement of an internal combustion engine, comprising:
a drive pulley connected to a crankshaft for rotating therewith and located at a lower central position of the engine;
a first accessory aggregate pulley which, when seen in a vertical direction, is located above said drive pulley and, when seen in a horizontal direction, is spaced in a first direction from said drive pulley; and
a pulley unit including an accessory aggregate pulley set with a second accessory aggregate pulley and a third accessory aggregate pulley which, when seen in a horizontal direction, is located at a level of said second accessory aggregate pulley and, when seen in a vertical direction, is located below said second accessory aggregate pulley, and including an adjustable tensioning pulley and two idler pulleys,
said idler pulleys having an upper pulley and a lower pulley, with said tensioning pulley, when seen in a vertical direction, located between said two idler pulleys,
and said pulley unit being located within a corridor space which is substantially equidistant and which extends substantially vertically and which, when seen in a horizontal direction, is spaced in a second direction opposite to said first direction from said drive pulley, wherein said tensioning pulley and said idler pulleys, when seen in a horizontal direction, are located between said accessory aggregate pulley set and said drive pulley, and wherein said serpentine belt extends from said drive pulley to said tensioning pulley, from said tensioning pulley to said first accessory aggregate pulley, from said first accessory aggregate pulley to said upper pulley, from said upper pulley to said lower pulley, from said lower pulley to said second accessory aggregate pulley, from said second accessory aggregate pulley to said third accessory aggregate pulley, and from said third accessory aggregate pulley to said drive pulley.

6. The serpentine accessory-belt, aggregate, drive arrangement according to claim 5, wherein said drive pulley, said accessory aggregate pulleys, and said upper pulley are located at the inner side of said serpentine belt, while said tensioning pulley and said lower pulley are arranged at the outer side of said serpentine belt.

7. The serpentine accessory-belt, aggregate, drive arrangement according to claim 5, the arrangement being provided on a frontal side of said engine block wherein said first direction is an exhaust side of said engine block and said second direction is an intake side of said engine block.

8. The serpentine accessory-belt, aggregate, drive arrangement according to claim 5, wherein said pulleys are mounted on a front side of the engine.

* * * * *